(12) United States Patent
Shivdeo et al.

(10) Patent No.: US 9,003,139 B1
(45) Date of Patent: Apr. 7, 2015

(54) SYSTEMS AND METHODS FOR RECOVERING VIRTUAL MACHINES AFTER DISASTER SCENARIOS

(75) Inventors: Vinayak Shivdeo, Erandawane (IN); Samir Kanse, Baner (IN)

(73) Assignee: Symantec Corporation, Mountain View, CA (US)

( * ) Notice: Subject to any disclaimer, the term of this patent is extended or adjusted under 35 U.S.C. 154(b) by 578 days.

(21) Appl. No.: 13/233,534

(22) Filed: Sep. 15, 2011

(51) Int. Cl.
*G06F 12/00* (2006.01)
*G06F 11/16* (2006.01)

(52) U.S. Cl.
CPC ....................................... *G06F 11/16* (2013.01)

(58) Field of Classification Search
CPC ............ G06F 2212/657; G06F 3/0608; G06F 3/0646; G06F 3/0674
USPC .......................................... 711/156, 162, 165
See application file for complete search history.

(56) References Cited

U.S. PATENT DOCUMENTS

| 5,873,101 A | * | 2/1999 | Klein | 707/640 |
| 2002/0112113 A1 | * | 8/2002 | Karpoff et al. | 711/4 |
| 2010/0077160 A1 | * | 3/2010 | Liu et al. | 711/162 |

OTHER PUBLICATIONS

VMWare Communities; How do you restore VM images from snapshot?; http://communities.vmware.com/thread/141757; Apr. 25, 2008.
blog.scottlowe.org; Full VM Recovery with NetApp Snapshots; http://blog.scottlowe.org/2007/10/08/full-vm-recovery-with-netapp-snapshots/; Oct. 8, 2007.

\* cited by examiner

*Primary Examiner* — Gurtej Bansal
(74) *Attorney, Agent, or Firm* — ALG Intellectual Property, LLC

(57) ABSTRACT

A computer-implemented method for recovering virtual machines after disaster scenarios may include (1) identifying a request to restore a virtual machine disk backup image to a virtual machine disk, (2) in response to the request, identifying a block map of the virtual machine disk backup image, the block map identifying at least one allocated block as allocated on the virtual machine disk and at least one unused block as unused on the virtual machine disk, and then (3) restoring the allocated block from the virtual machine disk backup image to the virtual machine disk upon determining that the block map identifies the allocated block as allocated, but skipping restoration of the unused block from the virtual machine disk backup image to the virtual machine disk due to determining that the block map identifies the unused block as unused. Various other methods, systems, and computer-readable media are also disclosed.

20 Claims, 7 Drawing Sheets

SYSTEMS AND METHODS FOR RECOVERING VIRTUAL MACHINES AFTER DISASTER SCENARIOS

BACKGROUND

Organizations increasingly rely on virtualization technologies to improve the flexibility, efficiency, and stability of their data centers. One aspect of virtualization involves provisioning virtual machines with virtual disks for data storage. Virtual disks, like physical disks, may have unallocated space (e.g., unformatted disk regions) and/or unused space (e.g., formatted but unused).

In some scenarios, an organization may wish to back up its virtual machines so that it may recover them in the event of disaster or corruption. However, backing up and restoring a large virtual disk may be time- and resource-intensive. In traditional solutions, a backup system may back up only allocated blocks of data on a virtual disk. However, if an organization did not have a backup system with the capacity to back up only allocated virtual disk blocks at the time of backup, or if the backup system could not identify allocated virtual disk blocks at the time of backup, the organization may be left to restore the entire virtual disk, including unallocated blocks. Furthermore, these traditional virtual machine backup systems fail to improve the efficiency of restoring virtual disks from snapshots. Accordingly, the instant disclosure identifies a need for efficiently recovering virtual machines after disaster scenarios.

SUMMARY

As will be described in greater detail below, the instant disclosure generally relates to systems and methods for recovering virtual machines after disaster scenarios by mapping allocated and/or used blocks on the virtual disk image at the time of recovery and restoring only allocated and/or used blocks to the virtual disk. In one example, a computer-implemented method for recovering virtual machines after disaster scenarios may include (1) identifying a request to restore a virtual machine disk backup image to a virtual machine disk, (2) in response to the request, identifying a block map of the virtual machine disk backup image, the block map identifying at least one allocated block as allocated on the virtual machine disk and at least one unused block as unused on the virtual machine disk, and (3) restoring the allocated block from the virtual machine disk backup image to the virtual machine disk upon determining that the block map identifies the allocated block as allocated, but skipping restoration of the unused block from the virtual machine disk backup image to the virtual machine disk due to determining that the block map identifies the unused block as unused.

In one embodiment, the computer-implemented method may also include (1) identifying a backup request to back up the virtual machine disk, (2) creating a persistent snapshot of the virtual machine disk in response to the backup request, the persistent snapshot persisting to exist after the backup request is fulfilled, and (3) creating the virtual machine disk backup image from the persistent snapshot.

In one example, the computer-implemented method may also include (1) identifying a backup request to back up the virtual machine disk and (2) creating a backup image of the entire virtual machine disk, the backup image including at least one unused block. In another example, the computer-implemented method may also include (1) identifying a backup request to back up the virtual machine disk and (2) creating a backup image of the entire virtual machine disk, the backup image including at least one unallocated block.

In one embodiment, identifying the block map of the virtual machine disk backup image may include retrieving data for the block map from a virtual machine mapping service. In some examples, the computer-implemented method may also include, in response to the request, mounting a snapshot of the virtual machine disk corresponding to the virtual machine disk backup image. In these examples, restoring the allocated block from the virtual machine disk backup image may include restoring the allocated block from the snapshot. Additionally or alternatively, restoring the allocated block may include restoring the allocated block upon determining that the block map identifies the allocated block as used to store a file on the virtual machine disk. In one example, skipping restoration of the unused block due may be done due to determining that the block map identifies the unused block as unallocated for use on the virtual machine disk.

In one embodiment, a system for implementing the above-described method may include an identification module programmed to identify a request to restore a virtual machine disk backup image to a virtual machine disk. This system may also include a mapping module programmed to, in response to the request, identify a block map of the virtual machine disk backup image, where the block map identifies at least one allocated block as allocated on the virtual machine disk and at least one unused block as unused on the virtual machine disk.

The system may additionally include a restoration module programmed to restore the allocated block from the virtual machine disk backup image to the virtual machine disk upon determining that the block map identifies the allocated block as allocated, but skipping restoration of the unused block from the virtual machine disk backup image to the virtual machine disk due to determining that the block map identifies the unused block as unused. In addition, the system may include at least one processor configured to execute the identification module, the mapping module, and the restoration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to restore a virtual machine disk backup image to a virtual machine disk, (2) in response to the request, identify a block map of the virtual machine disk backup image, the block map identifying at least one allocated block as allocated on the virtual machine disk and at least one unused block as unused on the virtual machine disk, and (3) restore the allocated block from the virtual machine disk backup image to the virtual machine disk upon determining that the block map identifies the allocated block as allocated, but skip restoration of the unused block from the virtual machine disk backup image to the virtual machine disk due to determining that the block map identifies the unused block as unused.

As will be explained in greater detail below, by mapping allocated and/or used blocks on the virtual disk image at the time of recovery and restoring only allocated and/or used blocks to the virtual disk, the systems and methods described herein may reduce the time and computing resources that may otherwise be consumed in restoring the virtual disk image. Furthermore these systems and methods may avoid the need for a particular backup method for the virtual disk, and so may provide greater flexibility and work under a wider variety of contexts.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
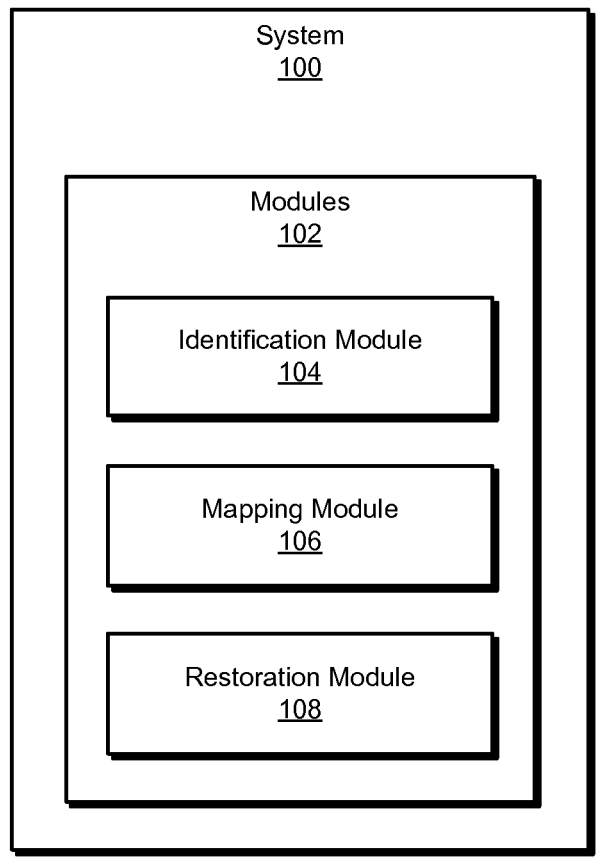
FIG. 1 is a block diagram of an exemplary system for recovering virtual machines after disaster scenarios.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
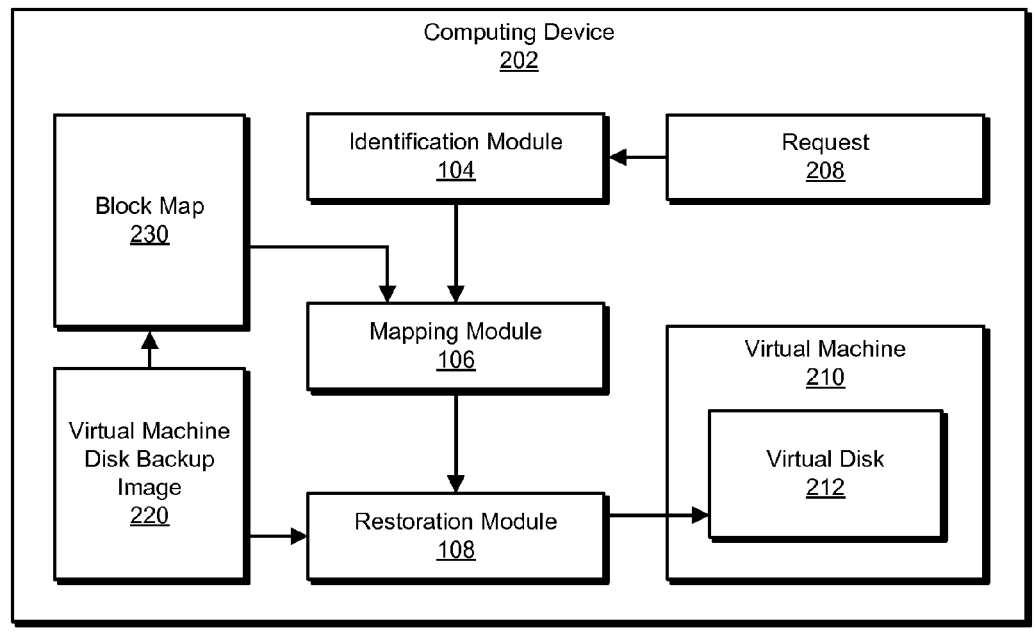
FIG. 2 is a block diagram of an exemplary system for recovering virtual machines after disaster scenarios.
Figure 3:
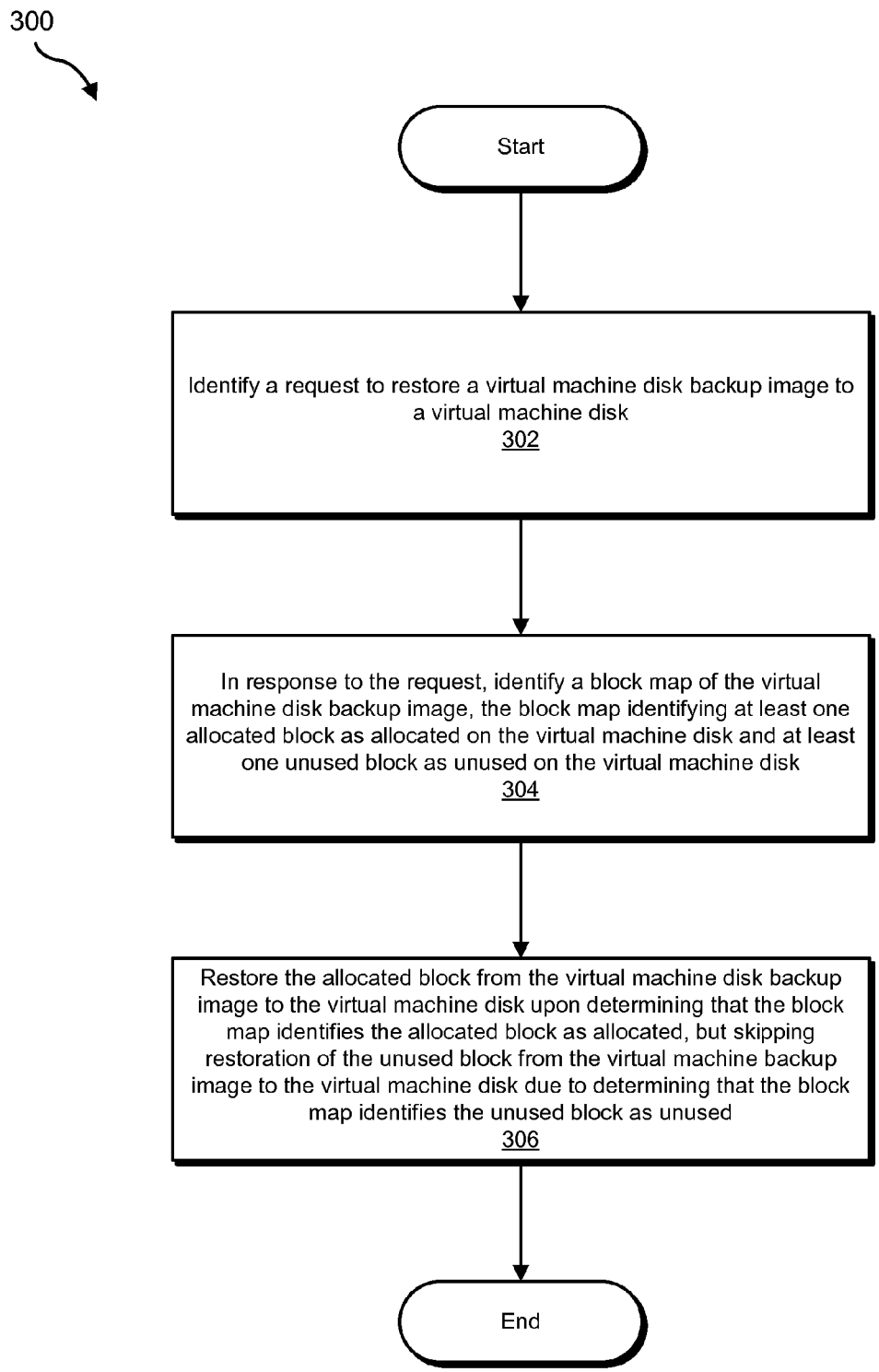
FIG. 3 is a flow diagram of an exemplary method for recovering virtual machines after disaster scenarios.
Figure 4:
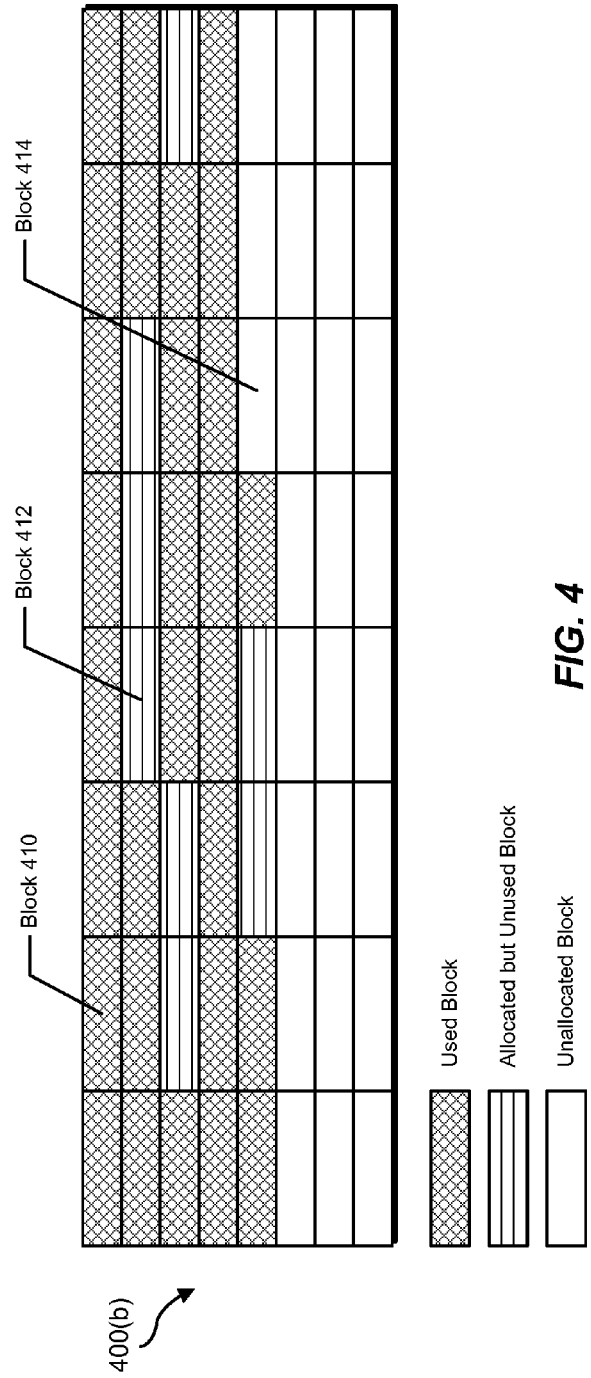
FIG. 4 is an illustration of an exemplary virtual disk image used for recovery.

The following will provide, with reference to FIGS. 1, 2, and 4, detailed descriptions of exemplary systems for recovering virtual machines after disaster scenarios. Detailed descriptions of corresponding computer-implemented methods will also be provided in connection with FIG. 3. Detailed descriptions of an exemplary virtual disk image will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for recovering virtual machines after disaster scenarios. As illustrated in this figure, exemplary system 100 may include one or more modules 102 for performing one or more tasks. For example, and as will be explained in greater detail below, exemplary system 100 may include an identification module 104 programmed to identify a request to restore a virtual machine disk backup image to a virtual machine disk. Exemplary system 100 may also include a mapping module 106 programmed to, in response to the request, identify a block map of the virtual machine disk backup image that identifies at least one allocated block and at least one unused block on the virtual machine disk.

In addition, and as will be described in greater detail below, exemplary system 100 may include a restoration module 108 programmed to restore the allocated block from the virtual machine disk backup image to the virtual machine disk upon determining that the block map identifies the allocated block as allocated, but skip restoration of the unused block from the virtual machine disk backup image to the virtual machine disk due to determining that the block map identifies the unused block as unused. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 hosting a virtual machine 210.

In one embodiment, one or more of modules 102 from FIG. 1 may, when executed by at least one processor of computing device 202, facilitate computing device 202 in recovering virtual machines after disaster scenarios. For example, and as will be described in greater detail below, one or more of modules 102 may cause computing device 202 to (1) identify a request 208 to restore a virtual machine disk backup image 220 to a virtual disk 212, (2) in response to the request, identify a block map 230 of virtual machine disk backup image 220 that identifies at least one allocated block as allocated on virtual disk 212 and at least one unused block as unused on virtual disk 212, and then (3) restore the allocated block from virtual machine disk backup image 220 to virtual machine disk 212 upon determining that block map 230 identifies the allocated block as allocated, but skip restoration of the unused block from virtual machine disk backup image 220 to virtual machine disk 212 due to determining that block map 230 identifies the unused block as unused.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

FIG. 3 is a flow diagram of an exemplary computer-implemented method 300 for recovering virtual machines after disaster scenarios. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to restore a virtual machine disk backup image to a virtual machine disk. For example, at step 302 identification module 104 may, as part of computing device 202 in FIG. 2, identify request 208 to restore virtual machine disk backup image 220 to virtual disk 212.

As used herein, the phrase "virtual machine disk" (or "virtual disk") may refer to any data structure that may be interpreted by a virtual machine as a disk or other physical storage medium (e.g., a solid-state storage device). For example, a "virtual disk" may refer to a VMWARE VIRTUAL MACHINE DISK ("VMDK"). In some examples, the phrase "virtual disk" may refer to a thick-provisioned virtual disk. Alternatively, the phrase "virtual disk" may refer to a thin-provisioned virtual disk.

As used herein, the phrase "virtual machine disk backup image" may refer to any data structure including backup data of a virtual machine disk. As will be described in greater detail below, in some examples the phrase "virtual machine backup image" may refer to a full copy of a virtual disk as viewed by a virtual machine. In some examples, the phrase "virtual machine backup image" may refer to a mountable snapshot of a virtual disk.

FIG. 4 is an illustration of an exemplary virtual machine disk backup image 400(a) and an exemplary block map 400(b). According to some examples, the virtual machine disk backup image 400(a) may represent a full view of the virtual disk at the time of backup from the perspective of a virtual machine. As will be explained in greater detail below, in some examples, the virtual machine disk backup image may be created from a snapshot of the virtual disk. For example, a backup system may take a persistent snapshot of the virtual disk to create the virtual machine disk backup image. The systems and methods described herein may then later mount the persistent snapshot and restore the virtual disk via the persistent snapshot. As will also be explained in greater detail below, in some examples, systems and methods described herein may create the virtual machine disk backup image.

Returning to step 302 of FIG. 3, identification module 104 may identify the request to restore the virtual machine disk backup image in any suitable manner. For example, identification module 104 may receive a message containing the request. Additionally or alternatively, identification module 104 may identify a system failure resulting in loss of data (including, e.g., the virtual disk) and requiring recovery.

Figure 5:
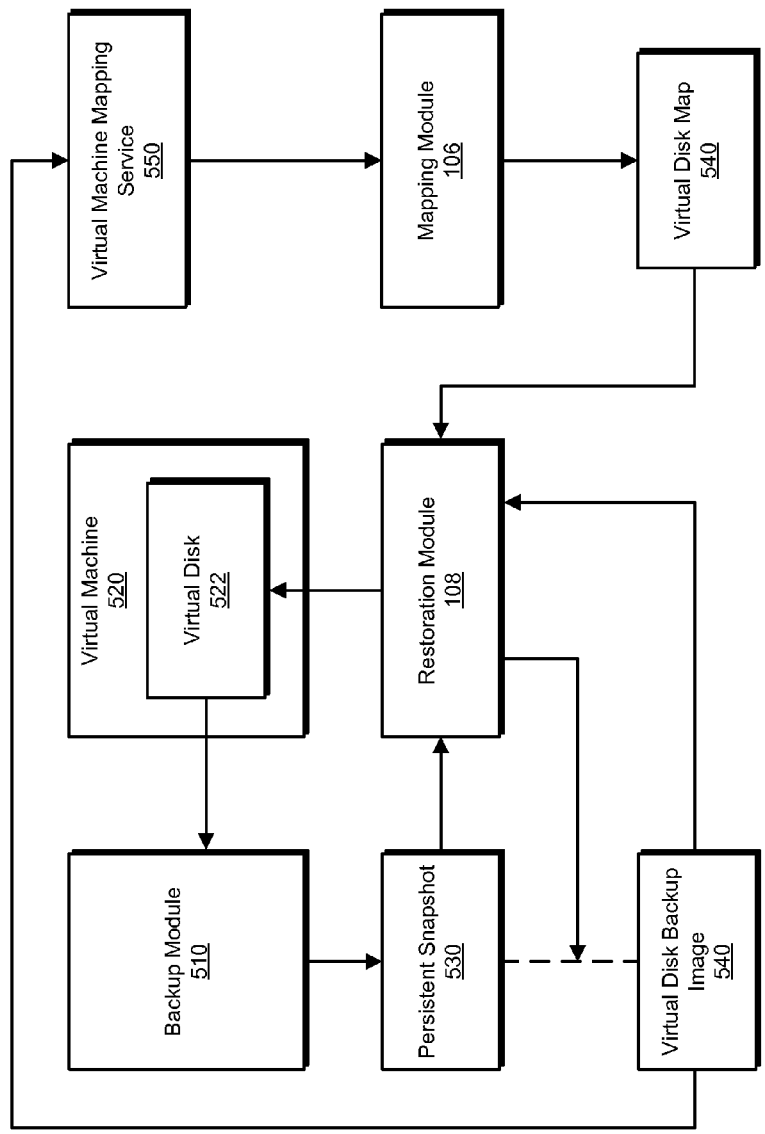
FIG. 5 is a block diagram of an exemplary system for recovering virtual machines after disaster scenarios.

FIG. 5 is an illustration of an exemplary system for recovering virtual machines after disaster scenarios. Using FIG. 5 as an example, at step 302 identification module 104 may identify a request to restore a virtual disk backup image 540 to a virtual disk 522.

Returning to FIG. 3, at step 304 one or more of the systems described herein may, in response to the request, identify a block map of the virtual machine backup image that identifies at least one allocated block as allocated on the virtual machine disk and at least one unused block as unused on the virtual disk. For example, at step 304 mapping module 106 may, as part of computing device 202 in FIG. 2, in response to request 208, identify block map 230. Using FIG. 5 as an additional example, at step 304 mapping module 106 may, in response to a request, identify a virtual disk map 540.

As used herein, the term "block map" may refer to any data structure capable of distinguishing allocated and/or used blocks within a representation of a virtual disk (e.g., the virtual machine disk backup image) from unallocated and/or unused blocks within the representation of the virtual disk. In some examples, the block map may simply identify which blocks are allocated and which blocks are unallocated. In these examples, the block map may identify the unused block simply by identifying an unallocated block. In other examples, the block map may identify which blocks are used and which blocks are unused. In these examples, the block map may identify the allocated block simply by identifying a used block. In some examples, the block map may identify allocated and used blocks, allocated and unused blocks, and unallocated blocks. In some examples, the block map may include one or more bitmaps with flags designated used and/or unallocated blocks. Additionally or alternatively, the block map may include file system metadata indicating disk addresses where files are stored. In some examples, the block map may include partition information to indicate which blocks within the virtual machine disk backup image are allocated.

Using FIG. 4 as an example, exemplary block map 400(b) may distinguish between used blocks, allocated but unused blocks, and unallocated blocks of exemplary virtual machine disk backup image 400(a). For example, block map 400(b) may identify a block 410 within virtual machine disk backup image 400(a) as used. Similarly, block map 400(b) may identify a block 412 within virtual machine disk backup image 400(a) as allocated but unused, and may identify a block 414 within virtual machine disk backup image 400(a) as unallocated.

Mapping module 106 may identify the block map in any suitable manner. For example, mapping module 106 may retrieve data for the block map from a virtual machine mapping service. Using metadata retrieved from the virtual machine mapping service, mapping module 106 may prepare the block map. Additionally or alternatively, mapping module 106 may operate as a part of a virtual machine mapping service and/or include a virtual machine mapping facility. Using FIG. 5 as an example, mapping module 106 may retrieve virtual disk map 540 from and/or create virtual disk map 540 based on data retrieved from a virtual machine mapping service 550.

Returning to FIG. 3, at step 306 one or more of the systems described herein may, in response to the request, restore the allocated block from the virtual machine disk backup image to the virtual machine disk upon determining that the block map identifies the allocated block as allocated, but skip restoration of the unused block from the virtual machine backup image to the virtual machine disk due to determining that the block map identifies the unused block as unused. For example, at step 306 restoration module 108 may, as part of computing device 202 in FIG. 2, and in response to request 208, restore the allocated block from virtual machine disk backup image 220 to virtual machine disk 212 upon determining that block map 230 identifies the allocated block as allocated, but skip restoration of the unused block from virtual machine backup image 220 to virtual machine disk 212 due to determining that block map 230 identifies the unused block as unused. Using FIG. 5 as an additional example, at step 306 restoration module 108 may, in response to the request, restore the allocated block from virtual disk backup image 540 to virtual disk 522 upon determining that virtual disk map 540 identifies the allocated block as allocated, but skip restoration of the unused block from virtual disk backup image 540 to virtual disk 522 due to determining that virtual disk map 540 identifies the unused block as unused.

As mentioned earlier, in some examples the block map may identify the allocated block simply by identifying a used block and may identify the unused block simply by identifying an unallocated block. Accordingly, in some examples restoration module 108 may restore the allocated block upon determining that the block map identifies the allocated block as used to store a file on the virtual machine disk. Likewise, in some examples restoration module 108 may skip restoration of the unused block due to determining that the block map identifies the unused block as unallocated for use on the virtual machine disk.

Using FIG. 4 as an example, restoration module 108 may restore block 410 because block 410 is used. However, restoration module 108 may skip restoration of block 412 because block 412 is unused. Similarly, restoration module 108 may skip restoration of block 414 because block 414 is unallocated. In some examples, the block map may only distinguish between allocated and unallocated blocks. In these examples, restoration module 108 may restore blocks 410 and 412 because blocks 410 and 412 are allocated, but skip restoration of block 414 because block 414 is unallocated. In other examples, the block map may only distinguish between used blocks and unused blocks. In these examples, restoration module 108 may restore block 410 because block 410 is used, but skip restoration of blocks 412 and 414 because blocks 412 and 414 are unused.

Restoration module 108 may restore the allocated block in any of a variety of ways. In some examples, restoration module 108 may restore the allocated block directly from the virtual machine disk backup image. Additionally or alternatively, restoration module 108 may restore the allocated block from a snapshot corresponding to the virtual machine disk backup image. For example, restoration module 108 may, in response to the request, mount a snapshot of the virtual machine disk corresponding to the virtual machine backup image and then read the allocated block from the snapshot. Using FIG. 5 as an example, restoration module 108 may restore the allocated block from a persistent snapshot 530 associated with virtual disk backup image 540. After step 306, method 300 may terminate.

In some examples, one or more systems described herein may also create the virtual machine disk backup image. For example, one or more systems described herein may (1) identify a backup request to back up the virtual machine disk, (2) create a persistent snapshot of the virtual machine disk in response to the backup request, the persistent snapshot persisting to exist after the backup request is fulfilled, and then (3) create the virtual machine disk backup image from the persistent snapshot. Using FIG. 5 as an example, a backup module 510 may identify the backup request to back up virtual disk 522. Backup module 510 may then create persistent snapshot 530 of virtual disk 522 in response to the backup request. Backup module 510 may then create virtual disk backup image 540 from persistent snapshot 530. Persistent snapshot 530 may persist to exist after backup module 510 has created virtual disk backup image 540. In some examples, backup module 510 may associate persistent snapshot 530 with virtual disk backup image 540 to facilitate the use of persistent snapshot 530 at the time of restoring virtual disk backup image 540 to virtual disk 522.

In some examples, one or more of the systems described herein may create the virtual machine disk backup image including one or more unused blocks within the virtual machine disk. For example, backup module 510 may identify a backup request to back up the virtual disk. Backup module 510 may then create a backup image of the entire virtual machine disk (e.g., the virtual machine disk backup image) by copying both used and unused blocks from the virtual machine disk.

In some examples, one or more of the systems described herein may create the virtual machine disk backup image including one or more unallocated blocks within the virtual machine disk. For example, backup module 510 may identify a backup request to back up the virtual disk. Backup module 510 may then create a backup image of the entire virtual machine disk (e.g., the virtual machine disk backup image) by copying both allocated and unallocated blocks from the virtual machine disk.

As described above, by mapping allocated and/or used blocks on the virtual disk image at the time of recovery and restoring only allocated and/or used blocks to the virtual disk, the systems and methods described herein may reduce the time and computing resources that may otherwise be consumed in restoring the virtual disk image. Furthermore these systems and methods may avoid the need for a particular backup method for the virtual disk, and so may provide greater flexibility and work under a wider variety of contexts.

For example, the systems and methods described herein may protect a VMWARE virtual machine hosting MICROSOFT WINDOWS GUESTOS and with a 100 gigabyte VMDK disk formatted with NEW TECHNOLOGY FILE SYSTEM ("NTFS"). 40 gigabytes of the VMDK disk may be allocated and used, leaving 60 gigabytes unused. The systems and methods described herein may protect the VMWARE virtual machine by taking a snapshot of the virtual machine using an agent installed inside the virtual machine. These systems and methods may then restore the virtual machine by mounting the snapshot (which may be visible as a 100 gigabyte logical unit). These systems and methods may then use VERITAS FEDERATED MAPPING SERVICE ("VxMS") on the snapshot to identify unallocated and/or unused blocks on the snapshot. These systems and methods may then read the allocated and used blocks from the snapshot and copy them to the VMDK disk. Accordingly, these systems and methods may only read and write 40 gigabytes instead of 100 gigabytes in the restore process.

Figure 6:
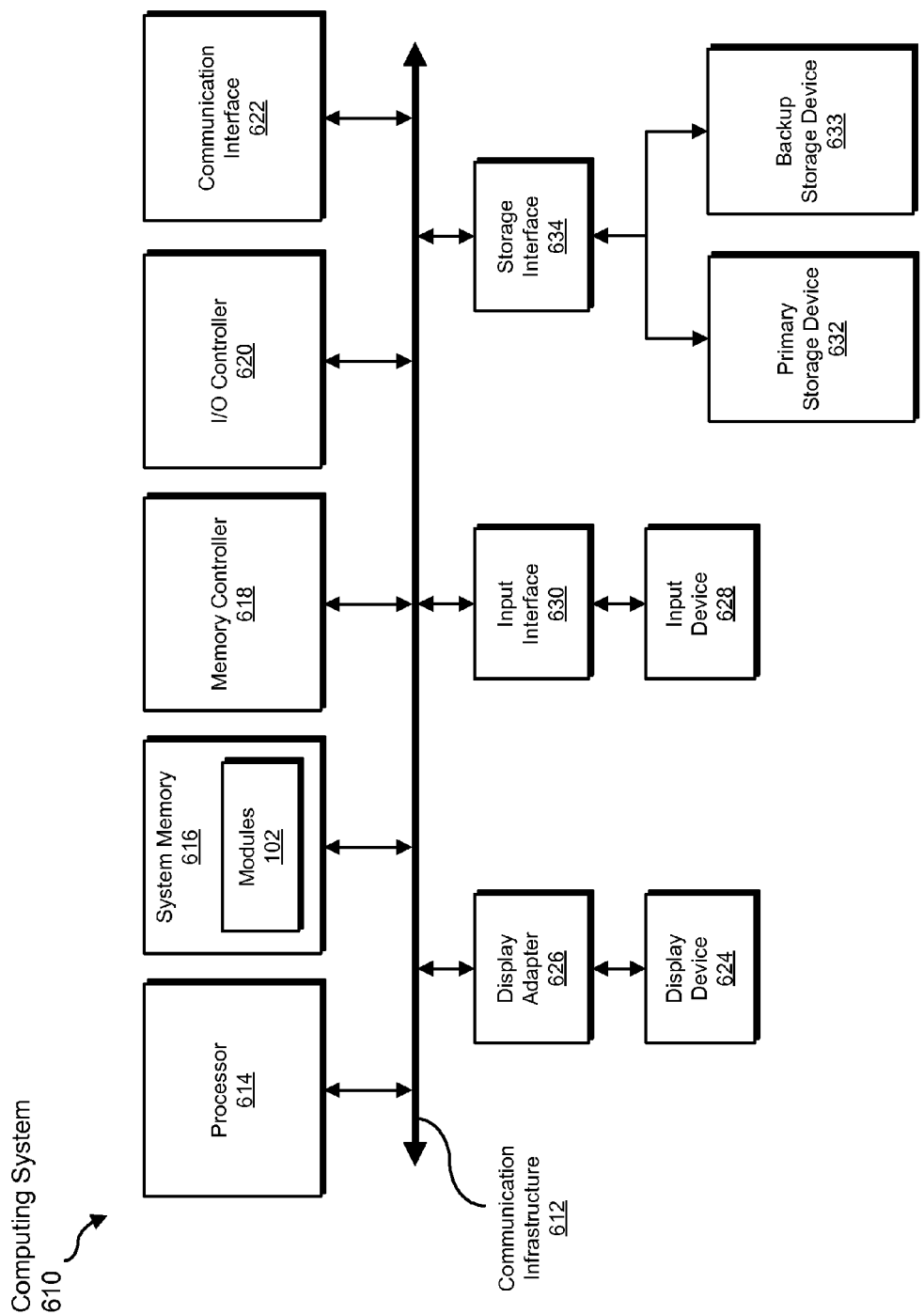
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the identifying, retrieving, restoring, skipping, determining, mounting, and/or creating steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions.

Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
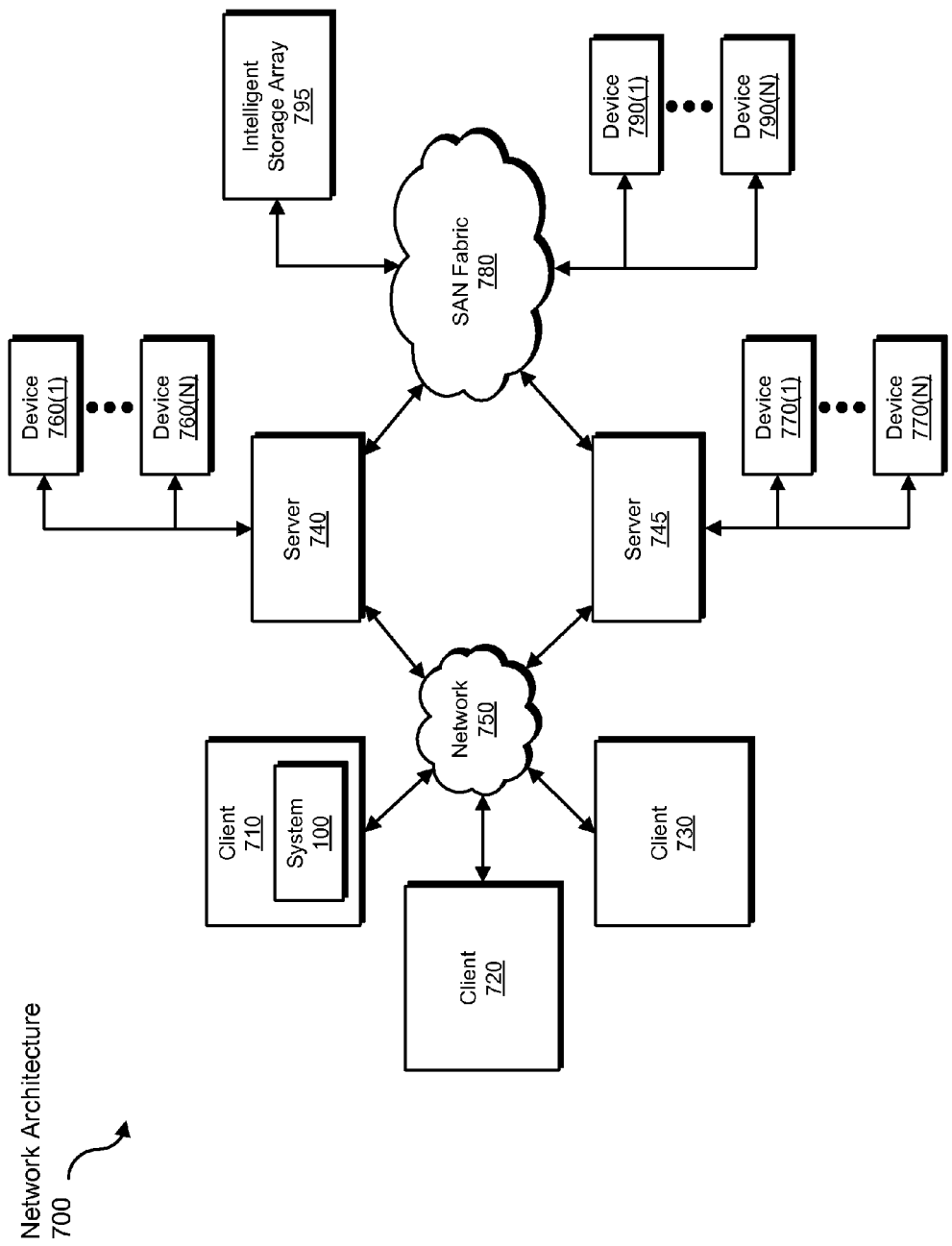
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, retrieving, restoring, skipping, determining, mounting, and/or creating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for recovering virtual machines after disaster scenarios.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for efficiently restoring virtual disks. As another example, one or more of the modules recited herein may transform a virtual disk with data loss into a restored virtual disk.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for recovering virtual machines after disaster scenarios, the method comprising:
   identifying a request to restore a virtual machine disk backup image to a virtual machine disk;
   in response to the request:
   mounting a snapshot corresponding to the virtual machine disk backup image;
   after mounting the snapshot, retrieving metadata from a virtual machine mapping service;
   identifying, based on the metadata retrieved from the virtual machine mapping service, a block map of the virtual machine disk backup image;
   checking the block map to determine whether at least one first block is allocated on the virtual machine disk;
   checking the block map to determine whether at least one second block is not allocated on the virtual machine disk;
   checking the block map to determine whether the second block is allocated but unused on the virtual machine disk;
   restoring the first block from the virtual machine disk backup image to the virtual machine disk upon determining that the block map identifies the first block as allocated, but skipping restoration of the second block from the virtual machine disk backup image to the virtual machine disk due to determining that the block map identifies the second block as one of (i) not allocated and (ii) allocated but unused;
   wherein the method is performed by a computing device comprising at least one hardware processor.

2. The computer-implemented method of claim 1, wherein restoring the first block from the virtual machine disk backup image comprises restoring the first block from the snapshot.

3. The computer-implemented method of claim 1, wherein restoring the first block upon determining that the block map identifies the first block as allocated further comprises restoring the first block upon determining that the block map identifies the first block as used to store a file on the virtual machine disk.

4. The computer-implemented method of claim 1, wherein skipping restoration of the second block comprises skipping restoration of the second block due to determining that the block map identifies the second block as unallocated for use on the virtual machine disk.

5. The computer-implemented method of claim 1, further comprising:
   identifying a backup request to back up the virtual machine disk;
   creating the snapshot of the virtual machine disk in response to the backup request, the snapshot persisting to exist after the backup request is fulfilled;
   creating the virtual machine disk backup image from the snapshot.

6. The computer-implemented method of claim 1, further comprising:
   identifying a backup request to back up the virtual machine disk;
   creating a backup image of the entire virtual machine disk, the backup image comprising at least one unused block.

7. The computer-implemented method of claim 1, further comprising:
   identifying a backup request to back up the virtual machine disk;
   creating a backup image of the entire virtual machine disk, the backup image comprising at least one unallocated block.

8. The computer-implemented method of claim 1, wherein the snapshot was taken using an agent installed inside a virtual machine that corresponds to the virtual machine disk.

9. A system for recovering virtual machines after disaster scenarios, the system comprising:
   an identification module programmed to identify a request to restore a virtual machine disk backup image to a virtual machine disk;
   a mapping module programmed to, in response to the request:
   mount a snapshot corresponding to the virtual machine disk backup image;
   after mounting the snapshot, retrieve metadata from a virtual machine mapping service;
   identify, based on the metadata retrieved from the virtual machine mapping service, a block map of the virtual machine disk backup image;
   check the block map to determine whether at least one first block is allocated on the virtual machine disk;
   check the block map to determine whether at least one second block is not allocated on the virtual machine disk;

check the block map to determine whether the second block is allocated but unused on the virtual machine disk;

a restoration module programmed to restore the first block from the virtual machine disk backup image to the virtual machine disk upon determining that the block map identifies the first block as allocated, but skip restoration of the second block from the virtual machine disk backup image to the virtual machine disk due to determining that the block map identifies the second block as one of (i) not allocated and (ii) allocated but unused;

at least one processor configured to execute the identification module, the mapping module, and the restoration module.

10. The system of claim 9, wherein the restoration module restores the first block from the virtual machine disk backup image by restoring the first block from the snapshot.

11. The system of claim 9, wherein the restoration module restores the first block upon determining that the block map identifies the first block as allocated by restoring the first block upon determining that the block map identifies the first block as used to store a file on the virtual machine disk.

12. The system of claim 9, wherein the restoration module skips restoration of the second block due to determining that the block map identifies the second block as unallocated for use on the virtual machine disk.

13. The system of claim 9, further comprising a backup module programmed to:

identify a backup request to back up the virtual machine disk;

create the snapshot of the virtual machine disk in response to the backup request, the snapshot persisting to exist after the backup request is fulfilled;

create the virtual machine disk backup image from the snapshot.

14. The system of claim 9, further comprising a backup module programmed to:

identify a backup request to back up the virtual machine disk;

create a backup image of the entire virtual machine disk, the backup image comprising at least one unused block.

15. The system of claim 9, further comprising a backup module programmed to:

identify a backup request to back up the virtual machine disk;

create a backup image of the entire virtual machine disk, the backup image comprising at least one unallocated block.

16. The system of claim 9, wherein the snapshot was taken using an agent installed inside a virtual machine that corresponds to the virtual machine disk.

17. A non-transitory computer-readable-storage medium comprising one or more computer-executable instructions that, when executed by at least one processor of a computing device, cause the computing device to:

identify a request to restore a virtual machine disk backup image to a virtual machine disk;

in response to the request:

mount a snapshot corresponding to the virtual machine disk backup image;

after mounting the snapshot, retrieve metadata from a virtual machine mapping service;

identify, based on the metadata retrieved from the virtual machine mapping service, a block map of the virtual machine disk backup image;

check the block map to determine whether at least one first block is allocated on the virtual machine disk;

check the block map to determine whether at least one second block is not allocated on the virtual machine disk;

check the block map to determine whether the second block is allocated but unused on the virtual machine disk;

restore the first block from the virtual machine disk backup image to the virtual machine disk upon determining that the block map identifies the first block as allocated, but skip restoration of the second block from the virtual machine disk backup image to the virtual machine disk due to determining that the block map identifies the second block as one of (i) not allocated and (ii) allocated but unused.

18. The computer-readable-storage medium of claim 17, wherein the one or more computer-executable instructions cause the computing device to restore the first block from the virtual machine disk backup image by causing the computing device to restore the first block from the snapshot.

19. The computer-readable-storage medium of claim 17, wherein the one or more computer-executable instructions cause the computing device to restore the first block upon determining that the block map identifies the first block as allocated further by causing the computing device to restore the first block upon determining that the block map identifies the first block as used to store a file on the virtual machine disk.

20. The computer-readable-storage medium of claim 17, wherein the one or more computer-executable instructions cause the computing device to skip restoration of the second block due to determining that the block map identifies the second block as unallocated for use on the virtual machine disk.

* * * * *